US010792619B2

(12) United States Patent
Lim et al.

(10) Patent No.: US 10,792,619 B2
(45) Date of Patent: Oct. 6, 2020

(54) MEMBRANE MODULE

(71) Applicants: Fui Wen Lim, London (GB); Andrew Guy Livingston, London (GB); Andrew Timothy Boam, London (GB)

(72) Inventors: Fui Wen Lim, London (GB); Andrew Guy Livingston, London (GB); Andrew Timothy Boam, London (GB)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 15/486,437

(22) Filed: Apr. 13, 2017

(65) Prior Publication Data
US 2017/0216778 A1 Aug. 3, 2017

Related U.S. Application Data

(63) Continuation of application No. 13/121,006, filed as application No. PCT/GB2009/051255 on Sep. 24, 2009, now abandoned.

(30) Foreign Application Priority Data

Sep. 25, 2008 (GB) .................................. 0817563.0

(51) Int. Cl.
B01D 67/00 (2006.01)
B01D 61/02 (2006.01)
(Continued)

(52) U.S. Cl.
CPC ......... B01D 67/009 (2013.01); B01D 61/027 (2013.01); B01D 63/10 (2013.01); B01D 71/64 (2013.01); B01D 2313/04 (2013.01)

(58) Field of Classification Search
None
See application file for complete search history.

(56) References Cited

U.S. PATENT DOCUMENTS 3,417,870 A * 12/1968 Bray ....................... A23L 2/085
210/321.83
3,837,900 A 9/1974 Englert et al.
(Continued)

FOREIGN PATENT DOCUMENTS

DE 19645537 A1 5/1998
DE 10333639 7/2004
(Continued)

OTHER PUBLICATIONS

Yarlagadda et al, "Experimental studies on comparison of microwave curing and thermal curing of epoxy resins used for alternative mould materials", Journal of Materials Processing Technology 155-156 (2004) 1532-1538.*
(Continued)

Primary Examiner — Krishnan S Menon
(74) Attorney, Agent, or Firm — JWIP & Patent Services, LLC; Jacob G. Weintraub, Esq.

(57) ABSTRACT

The present invention relates to a method for curing adhesives used in the manufacture of membrane modules containing polymeric membranes, particularly polyimide based membranes used for the nanofiltration or ultrafiltration of solutes dissolved in organic solvents using microwaves. To maximise the chemical resistance of the adhesive used in these organic solvent applications, it must be as fully reacted and crosslinked ("cured") as possible. Typically, thermal processing (heating) of the entire membrane module is used to cure the adhesives. However, the time and temperature required to achieve this high degree of completion of reaction may damage the separation performance of the membrane contained within the membrane module. In one particular aspect, this process utilises microwaves to preferentially promote the curing of epoxy adhesives over the general heating of the membrane module.

14 Claims, 1 Drawing Sheet

(51) Int. Cl.
    *B01D 71/64*     (2006.01)
    *B01D 63/10*     (2006.01)

(56) References Cited

U.S. PATENT DOCUMENTS

| | | | |
|---|---|---|---|
| 3,864,289 | A | 2/1975 | Rendall |
| 3,966,616 | A * | 6/1976 | Bray .................. B01D 63/10 210/450 |
| 4,499,036 | A | 2/1985 | Hawkes et al. |
| 4,532,041 | A | 7/1985 | Shuey et al. |
| 4,776,936 | A | 10/1988 | Smith et al. |
| 4,877,421 | A | 10/1989 | Bikson et al. |
| 5,721,286 | A | 2/1998 | Lauf et al. |
| 5,725,769 | A | 3/1998 | Miller et al. |
| 6,180,008 | B1 | 1/2001 | White |
| 2002/0070158 | A1 | 6/2002 | Buecher et al. |
| 2005/0020715 | A1 | 1/2005 | Hasegawa et al. |
| 2005/0123727 | A1 | 6/2005 | Hester et al. |
| 2007/0114167 | A1 | 5/2007 | Mabuchi et al. |

FOREIGN PATENT DOCUMENTS

| | | |
|---|---|---|
| HU | 201102075-7 | 9/2009 |
| JP | 58088005 | 5/1983 |
| JP | 9000888 | 1/1997 |
| JP | 9241406 | 9/1997 |
| JP | 2005131177 | 8/2006 |
| JP | 2006263600 | 10/2006 |
| WO | 97002725 | 1/1997 |

OTHER PUBLICATIONS

Dohrmann, M. et al., "Coiled membrane module for cross-flow or dead-end filtration processes", DE19645537, English language abstract.
Faghihi et al., "Microwave-Assisted Rapid Synthesis of Novel Optically Active Poly(Amide-Imide)s Conotaining Hydantoins and Thiohydantoins in Main Chain", Eruopean Polymer Journal, 39, pp. 247-254, 2003.
Yh, See-Toh, et al., "In Search of Standard Method for the Characterisation of Organic Solvent Nanofiltration Membranes", Journal of Membrane Science 2007, vol. 291, p. 120-125.
Meuse De, "The Microwave Processing of Polymeric Materials", Advances in Polymer Technology, 12(2), pp. 197-203, 1993.
F.Y.C. Boey, B.H. Yap and L. Chia, "Microwave Curing of Epoxy-Amine System—Effect of Curing Agent on the Rate Enhancement." (Abstract: Accepted on Mar. 12, 1998).

* cited by examiner

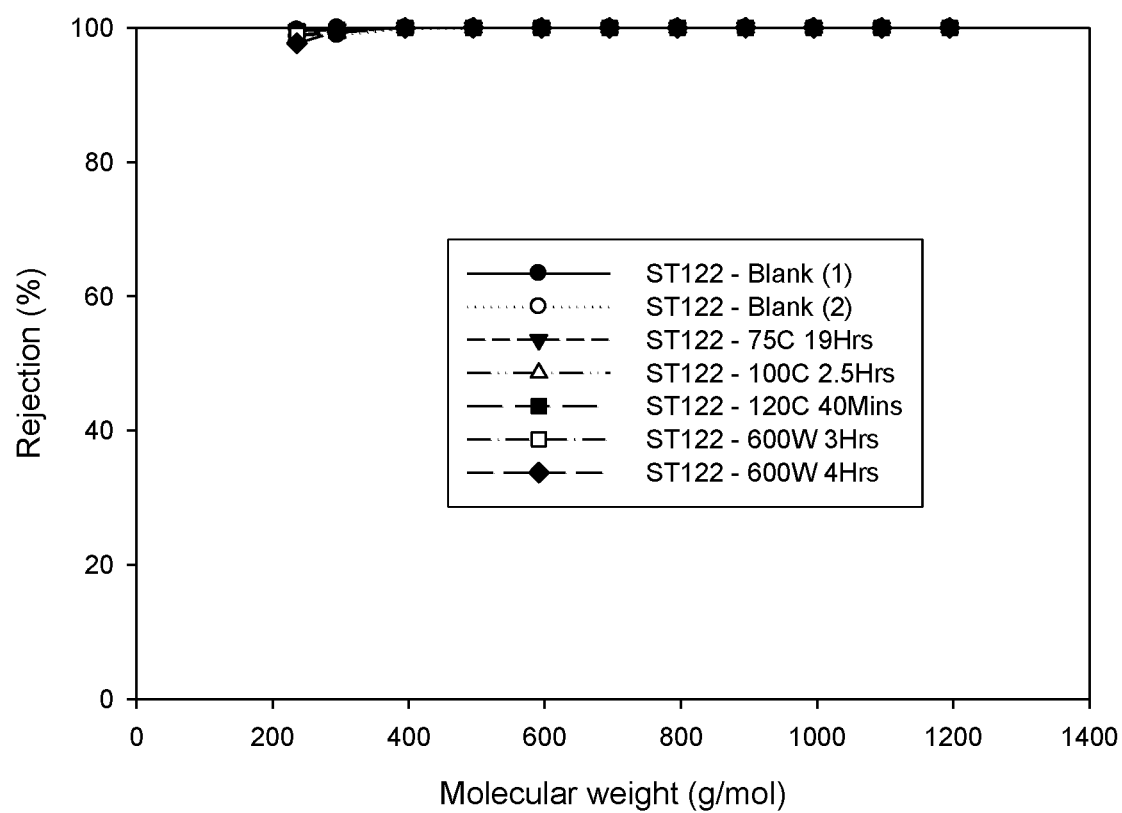

MEMBRANE MODULE

RELATED APPLICATIONS

This application is a continuation of U.S. application Ser. No. 13/121,006, filed Mar. 25, 2011, which is a National Stage application under 35 U.S.C. § 371 of International Application No. PCT/GB2009/051255, filed on Sep. 24, 2009, which claims the benefit of priority under 35 U.S.C. § 119 from Great Britain Application No. 0817563.0, filed on Sep. 25, 2008, each of which is incorporated herein by reference in their entirety.

The present invention relates to the manufacture of membrane modules containing polymeric membranes, particularly membranes used for the nanofiltration or ultrafiltration of solutes dissolved in organic solvents. In one particular aspect, this process utilises microwaves to preferentially promote the curing of epoxy adhesives over the general heating of the membrane module to preserve the separation properties of the incorporated membrane.

Membrane processes are well known in the art of separation science, and can be applied to a range of separations of species of varying molecular weights in liquid and gas phases (see for example "Membrane Technology and Applications" $2^{nd}$ Edition, R. W. Baker, John Wiley and Sons Ltd, ISBN 0-470-85445-6). For practical applications, membranes are generally not used in their cast form; rather they are incorporated into a membrane module. The design of membrane modules is tailored to provide a relatively high surface area of membrane per unit volume of feed solution to make a compact separation process. Common membrane module formats are spiral wound modules for polymeric membranes cast in sheet format, monoliths for ceramic membranes, hollow fibre modules for polymeric membranes cast in tubular form, and other formats are known to those skilled in the art. Other aspects of membrane modules that are important are that they provide a means of (i) protecting the membrane from damage during transport and handling, and (ii) directing the process flow(s) over the membrane surfaces.

Membrane modules contain several components, often fabricated from different materials, which must be attached together. When the components are fabricated from similar materials, techniques such as ultrasonic welding or hot melt welding can be used to join and fuse the components together. However, it is often not possible to do this, as either the materials are sufficiently chemically different that welding techniques do not work, or there is insufficient space/access to successfully apply the technique. Thus, adhesives are most commonly used to join together the components of a membrane module.

A suitable adhesive for fabricating a membrane module has to provide a number of properties: (1) it must be resistant to the chemical environment in which it will be used once cured; (2) it must be of a viscosity that allows it to be dispensed easily when forming glue lines during the fabrication process; (3) it must not swell to an extent that will damage the membrane module; (4) it must have a pot life (the time that it takes for the adhesive to cure sufficiently to be unworkable) greater than the time it takes to apply the glue lines and form the membrane module; (5) it must adhere to the components of the membrane module. Even though there are a wide variety of adhesives commercially available (e.g. cyanoacrylates, epoxy adhesives, polyurethane adhesives, and silicone adhesives), very few provide the properties outlined above. The most commonly used adhesives in membrane module formation are epoxy and polyurethane based adhesives.

Epoxy and polyurethane adhesives typically consist of two basic components. In the case of epoxy resins, these are a compound containing epoxy (oxirane) ring(s) and a curing agent (e.g. amines, polyamines, and amidoamines) that promote opening of the oxirane ring and formation of bonds with other molecules in the adhesive (crosslinking). In the case of polyurethanes, these are a polyol compound that contains multiple hydroxyl groups and a diisocyanate compound that reacts with the hydroxyl groups on the polyol to form urethane bonds—each isocyanate group on the diisocyante compound is capable of reacting with different polyol molecules thus forming crosslinks. It is known to those skilled in the art that other components can be added to epoxy and polyurethane formulations to modify their properties, e.g. additives can be used to modify (i) rheology of the uncured material; (ii) colour; (iii) electrical properties; (iv) optical properties; (v) flexibility; and (vi) thermal conductivity (see for example "Epoxy Adhesive Fomulations", E. M. Petrie, McGraw-Hill, 2006, ISBN 0-07-145544-2). However, the main factors influencing chemical resistance are (i) the choice of the two base components of the adhesive (i.e. the specific epoxy compound and curing agent for epoxy adhesives, and the choice of polyol and diisocyanate molecule for polyurethane adhesives), and (ii) the extent to which the crosslinking reaction has completed. This is particularly important for filtrations in organic solvents, where a membrane module may be used with a wide range of types of organic solvents and solutions, and thus maximising chemical resistance is paramount.

To maximise the properties of adhesives requires that they are left for a period of time prior to use for their properties to fully develop—i.e. curing. During curing, the crosslinking reactions within the adhesive matrix continue to take place. Curing is often carried out at elevated temperature to both increase the curing rate, and also to drive the crosslinking reaction to as close to 100% complete as possible. The latter is particularly important to maximise chemical resistance. Membrane modules are generally heated in an oven to provide the thermal energy necessary to cure the adhesive. However, heating the membrane module at too high a temperature may be detrimental to the membrane contained in the module. For instance, many polymeric membranes are not stable at temperatures above 60 deg C. and some show performance degradation even when heated to 40 deg C. Heating modules for extended periods at close to or above this critical temperature may have a detrimental effect on membrane performance, i.e. reduced flux or altered separation properties.

In the field of membrane technology, a number of uses of microwaves have been reported. Materials containing water or molecules containing hydroxyl groups are particularly strongly affected by microwaves, though materials containing other polar moieties will be affected to a lesser extent. Microwaves can be used to excite polarisable bonds, e.g. carbon-oxygen and oxygen-hydrogen bonds, in chemical structures to promote the rate of chemical reaction. This can be used as an alternative to thermal heating to drive chemical reactions.

DE10333639, IT11809074, JP9000888, JP2005131177 and JP2006263600 all teach the use of microwaves to dry solvent from cast membranes through microwave heating in a reduced pressure or vacuum environment. This allows the membrane to be successfully dried prior to further processing without introducing any thermal damage. JP58088005 teaches a variation on this technique, whereby a section of membrane is preferentially dried so that adhesives used to form the module will adhere successfully to the membrane. In this case, the bulk of the membrane stays in the wet state to maintain the desired separation properties and only the seal section of the membrane is dried.

Polyimide and poly(amide-imide) can be used to form asymmetric nanofiltration and ultrafiltration membranes (e.g. U.S. Pat. Nos. 5,725,769 and 6,180,008). These polymers can be formed via a microwave-driven reaction chemistry as polyimide does not contain a significant content of polarisable bonds and thus is minimally affected by microwaves. de Meuse, M. T. and Ryan, C. L., "The microwave processing of polymeric materials", Advances in Polymer Technology, 12(2), pp. 197-203 (1993), teach the use of microwaves to form polyimide as this technique offers a 20-40 fold higher rate of formation than thermal techniques. Faghihi et al. (Faghihi, K., Zamani, K., Mirsamie, A., and Sangi, M. R. "Microwave-assisted rapid synthesis of novel optically active poly(amide-imide)s containing hydantoins and thiohydantoins in main chain", European Polymer Journal, 39, pp. 247-254 (2003)) also teach the use of microwave assisted reaction chemistry to form poly(amide-imide) materials.

U.S. Pat. Nos. 3,864,289 and 4,776,936 teach the use of microwaves to modify the properties of a membrane after the memrbane is cast. U.S. Pat. No. 3,864,289 teaches the use of microwaves to promote in situ crosslinking of a cellulosic membrane. U.S. Pat. No. 4,776,936 teaches the coating of the active surface of a membrane with a polar activator, such that when the membrane is irradiated with microwaves the localised heating on the active surface causes it to densify and increase selectivity for gas separations. JP9241406 teaches the use of microwaves to form a plasma. The plasma is then used to modify the active surface of a membrane.

Metal components can be incorporated into assemblies that are irradiated by microwaves. However, the components have to be protected to prevent arcing due to the high frequency electric field that is generated inside the microwave irradiation apparatus. Two main techniques may be applied to eliminate arcing: (1) the metallic component is earthed with a suitable wire to the wall of the processing cavity inside the microwave apparatus, as this maintains the wall and the component at the same electric potential and thus there is no potential difference to generate an electric arc (e.g. as used in JP58088005), and; (2) by modulating the frequency/wavelength of the microwave source which also prevents the build up of potential differences between metallic components and arcing (e.g. WO9702725). A further way of minimising the probability of arcing is to switch the microwave source on and off at time intervals of a specified duration, which reduces the probability of a significant potential difference building up between the metallic components.

The use of microwaves to cure adhesives in situ in membrane modules is not described in the prior art. This is most likely because there are a number of potential difficulties in using microwaves for this purpose. Microwave heating is not uniformly applicable, however, and there are problems with this methodology. In the case of internal parts that are to be joined, the sudden and selective heating might cause relative movement between the parts to be joined before the joint is perfected. This problem does not arise in the traditional method involving slower heating of the parts and the adhesive. The problem also does not arise when curing or activating a surface that is already properly located. Furthermore, the frequency and duration of the radiation must be chosen carefully or the process will not work. This means that the method is not always reproducible.

Equally, existing methods of curing adhesive with a membrane are not without their problems. Such processes are time consuming and require heating over a period of time. The heating may adversely affect other parts of the membrane. There may be a problem of insufficient or excess heating of the adhesive and/or the rest of the membrane ensemble. There is thus a need to provide a process in which the adhesive can be heated selectively in preference to surrounding parts of the membrane. There is also a need for a process which is faster and more efficient than existing methods, thereby minimising production time and cost. The present invention satisfies some or all of these aims and overcomes problems with prior art processes.

According to one aspect of the present invention, there is provided a process for manufacturing a membrane module comprising a polymeric membrane, a feed spacer, a permeate spacer, a permeate tube, and end caps, the process comprising the steps of:
(a) applying an adhesive containing one or more polarisable bonds;
(b) positioning the polymeric membrane in its desired location within the membrane module to produce a green membrane module ensemble; and
(c) applying microwave radiation to the green ensemble.

In an embodiment, the polarisable bond is one or more of: a carbon-oxygen, carbon-nitrogen, carbon-halogen, oxygen-hydrogen, or nitrogen-hydrogen bond. The bond may be a single bond, or where chemically possible a double bond. Preferably the bond is a carbon-oxygen or oxygen-hydrogen bond.

The present invention provides a method to cure the adhesives used in forming spiral wound membrane modules which are particularly suitable for use in organic solvents. The membrane modules are formed using conventional membrane module rolling techniques and the module is exposed to microwaves to cure the adhesives used to seal the module. The radiation may be applied continuously, or in the form of pulses of radiation.

The energy of the radiation is calculated by reference to the nature and size of the membrane and the nature of the adhesive. Similarly, the frequency of radiation is chosen by reference to the nature of the adhesive. The duration of radiation exposure is calculated and carefully controlled. The time period when the radiation is applied as a pulse is between 0.1 seconds and 10 minutes, and is preferably from 1 second to 5 minutes for individual pulses of radiation. Alternatively, when the radiation is applied continuously, the radiation is applied for between 1 minute and 24 hours.

Many adhesives, such as epoxy adhesives, contain polarisable bonds, e.g. the carbon-oxygen bonds in the epoxy resin oxirane rings, and thus microwaves can be used to cure the epoxy adhesive. However, non-reactive materials with polarisable bonds simply heat up in the presence of microwaves. Therefore, when microwaves rather than thermal heating are used to cure epoxy adhesives in membrane modules, the module components (including the membrane) must contain a minimal content of polarisable bonds to prevent substantial heating of any material apart from the adhesive.

Thus it is an important feature of the invention that the adhesive used contains sufficient polarisable bonds to ensure adequate heating whilst at the same time not having too many polarisable bonds so as to cause overheating of the adhesive or the membrane.

In the context of the present invention, the terms the phrases "polarisable bonds" and "functional groups capable of being excited by microwave radiation" have the same meaning. The important feature is that the adhesive is able to absorb microwave radiation as a consequence of the presence of some polarisable bonds or functional groups capable of being excited by microwave radiation with the effect that the adhesive cures. It is therefore important that there is a sufficient number of polarisable bonds or functional groups capable of being excited by microwave radiation to enable the adhesive to absorb enough heat to cure. As stated above, the exact level of polarisable bonds is a balance between providing sufficient to ensure adequate heating and ensuring that there are not an excess which would cause the problem of overheating. The number of polarisable bonds chosen in a particular adhesive may vary depending upon the end application i.e. the nature of the membrane assembly being produced, bearing in mind the above balance. The adhesive must cure to a sufficient degree to guarantee the structural integrity of the membrane assembly. In practice, this generally means that the adhesive cure was fully. However, there may be cases when the adhesive is only, for example, 80% cured or 90% cured but that degree of curing is sufficient to ensure the structural integrity of the membrane assembly. It is also possible, in such circumstances, that curing continues have to application of the microwave radiation has ceased due to residual heat etc. and Since the membrane polymer material is not susceptible to microwave radiation, there is no significant heating of this polymer material. The heating is thus localised in the adhesive to permit curing of the adhesive without heating of the membrane assembly as a whole. The invention can thus be used with a wide range of susceptible (to microwave radiation) adhesives and non-susceptible polymer materials. The curing time and temperature for the adhesive will vary depending on the adhesive and its specific application. Temperatures less than 50 degrees will be typical for the curing process, with a temperature of less than 40 degrees being preferred and in some cases the temperature may be less than 30 degrees. Similarly, time frames of less than 1 hour, more preferably less than 0.5 hours, or even less than 0.2 or 0.1 hours may be sufficient to achieve the required degree of curing.

The invention also provides a membrane module for the nanofiltration of a feed stream solution, comprising a solvent and dissolved solutes and showing preferential rejection of the solutes at ambient temperature. The membrane module produced by the process of the present invention, whilst outwardly similar to conventional membrane modules, has better structural integrity. The quality of the resulting joints relative to conventionally bonded membranes is better as a result of more careful control of the heating. The membrane module also demonstrates excellent performance in filtering feed solutions.

The membrane module comprises a polymeric membrane, feed and permeate spacers, permeate tube, end caps, and adhesive. The adhesive used to form and seal the membrane module is cured using microwave radiation to render the specific adhesive composition used as resistant to the organic solvent feed solution as possible. The adhesive must include sufficient polarisable bonds to ensure adequate microwave heating. In one embodiment, a minimum number of polarisable bonds can be characterised as 1 bond per 5000 molecular weight units and a maximum of 1 bond per 50 molecular weight units.

The present invention also relates to an adhesive susceptible to microwave radiation, as described, which can be used to joint parts of a membrane ensemble.

Membrane module components for use in the process comprise feed spacers, permeate spacers, permeate tube, and end caps.

Materials for membrane module components consist of polypropylene, polyethylene, polyolefin blends, polyester, polyethylene terephthalate, polybutylene terephthalate, polyetheretherketone, polyamide, polyphenylene sulphide, polyvinylidene diflouride, polytetrafluoroethylene, ECTFE, FEP, PFA, carbon steel, stainless steel, and nickel alloys.

The microwave source produces microwave radiation capable of exciting chemical bonds in the adhesive formulation.

The microwave source may be of variable frequency and may be arranged to emit one or more different frequencies of radiation.

A method for forming a spiral wound membrane module, comprises the steps of:
  (a) cutting membrane leaves and spacer materials to the correct dimensions for the chosen size of membrane module;
  (b) placing the permeate tube on the rolling table;
  (c) attaching the permeate spacer to the permeate tube;
  (d) placing adhesive on the glue lines;
  (e) inserting the feed spacer into the membrane leaves and placing the membrane leaves in the appropriate position on the permeate spacer;
  (f) placing adhesive on the remaining glue lines;
  (g) rolling the membrane and spacers on the rolling table to form the spiral wound membrane module;
  (h) cutting through the glue line on the membrane leaves to open the feed spacer flow path whilst retaining an adhesive seal to the permeate side of the membrane leave;
  (i) placing end caps over the end of the membrane leaves and attaching in place with adhesive;
  (j) inserting membrane module into microwave irradiation apparatus;
  (k) applying microwave radiation to membrane module to fully cure the adhesive.

Membrane modules of the invention can be produced following methods described in the open literature and prior art, and production techniques are known to those skilled in the art. Membrane modules are formed from a number of components that must be attached together to form the membrane module product. The adhesive used in the formation process, once cured, must be sufficiently chemically resistant to provide stability in the end-use process.

Membrane modules in accordance with the invention may be made using an adhesive that contains polarisable bonds that are susceptible to microwave irradiation, feed and permeate spacer materials that are not susceptible to microwave irradiation, permeate tube that is not susceptible to microwave irradiation, end caps that are not susceptible to microwave radiation, and a polymeric membrane that is not susceptible to microwave irradiation. Once assembled into the membrane module, the membrane module assembly is irradiated with microwaves to cure the adhesive and achieve enhanced chemical resistance.

The feed and permeate spacers used in this invention may be made from materials that are not susceptible to microwave irradiation. These include by way of non-limiting example: polypropylene, polyethylene, polyolefin blends, polyester, polyethylene terephthalate, polybutylene terephthalate, polyetheretherketone, polyamide, polyphenylene sulphide, polyvinylidene diflouride, polytetrafluoroethylene, ECTFE, FEP, and PFA.

The permeate tubes and end caps used in this invention may be made from materials that are not susceptible to microwave irradiation. These include by way of non-limiting example: polypropylene, polyethylene, polyolefin blends, polyester, polyethylene terephthalate, polybutylene terephthalate, polyetheretherketone, polyamide, polyphenylene sulphide, polyvinylidene diflouride, polytetrafluoroethylene, ECTFE, FEP, and PFA.

In a second embodiment of the invention, the permeate tubes and end caps may be made from metallic materials, which by way of non-limiting example include carbon steel, stainless steel and nickel alloys.

When exposed to microwave radiation, these metallic components must be protected from generating sparks which may irreversibly damage the microwave apparatus. In a preferred embodiment of this aspect of the invention, arc minimisation may be achieved through earthing the metallic component to the cavity wall of the microwave radiation apparatus, or using a variable frequency microwave generator. In a further embodiment, the microwave generator may be switched on and off at specified time intervals to minimise arcing.

In a further embodiment of the invention, the membrane incorporated into the membrane module may be made from a material that is not susceptible to microwave radiation. By way of non-limiting example, the membrane may be made from a polymeric material through processes known to those skilled in the art including phase inversion to form integrally skinned asymmetric membranes, or interfacial polymerisation, or a coating process. Membrane polymers include polyethersulfone, polysulphone, polyacrylonitrile, polyetherimide, poly(amide-imide), and polyimide. These membranes may be coated using various rubbery materials, or may be coated using interfacial polymerisation, including coating with materials that form thin films of polyamides on the membrane surface. In a further embodiment, the membranes can be made from a polyimide polymer and post-treated by for example diamine crosslinking after the membrane has been cast. Suitable polyimide polymers include by way of non-limiting example P84 from HP Polymers (Lenzing, Austria) or Matrimid 5218 from Huntsman Advanced Materials. Suitable diamine crosslinking agents include by way of non-limiting example aliphatic amines such as diaminoethane, diaminopropane, diaminobutane, diaminopentane, diaminohexane, diaminoheptane, diaminooctane, diaminononane and diaminodecane, and aliphatic amines such toluenediamine and xylenediamine. In a further aspect of the invention, the membrane may incorporate either a conditioning agent that does not have polarisable bonds such that it is not susceptible to microwave radiation or should not include a conditioning agent at all. By way of non-limiting example, suitable conditioning agents include low volatility hydrocarbon materials, lubricating oil, and mineral oil. The membranes may also incorporate organic or inorganic fillers as discrete particles to enhance the separation properties, or chemical and mechanical resistance.

To achieve maximum chemical resistance of the adhesive used in manufacturing the membrane module, the components of the glue need to react to the maximum possible extent. This is conventionally achieved through thermal heating of the entire membrane module. However, the temperature required to achieve the maximum extent of reaction may be too high for many membrane materials which leads to unwanted changes in the permeate flux and separation performance of the membrane, i.e. if a membrane becomes unstable at 40 deg C. and an adhesive formulation requires curing at 100 deg C. then obtaining maximum chemical resistance through curing at 100 deg C. will cause unwanted changes to occur in the membrane. Also, there are adhesive formulations, such as by way of non-limiting example epoxy adhesives with aromatic amine curing agents, that may have the required chemical resistance but substantial curing is only initiated at temperatures in excess of 100 deg C. and commonly require temperatures in excess of 150 deg C. for the maximum extent of reaction to occur. It is known to those skilled in the art that polymeric membranes can become unstable at temperatures as low as 40 deg C., and many polymeric membranes become unstable at temperatures in the range 60 deg C. to 100 deg C. Nevertheless, these temperatures at which the membrane becomes unstable are below the ideal temperature at which a particular epoxy adhesive formulation may be cured. Therefore, the application of microwaves to adhesive curing in accordance with the invention allows the maximum extent of reaction to be reached in the adhesive without generating excessive overall heat in the module and consequent damage to the membrane material.

In one preferred embodiment of the invention, the adhesive used in fabricating the membrane module is an epoxy adhesive. The epoxy adhesive may consist of two primary components, an epoxy resin and a curing agent. It is known to those skilled in the art that optional additives such as viscosity modifiers, fillers, flexibilisers, and diluents may be added to the adhesive formulation to modify adhesive properties such as by way of non-limiting example gel time, viscosity, tensile strength, bending strain, optical properties, colour, thermal conductivity and electrical conductivity. The epoxy resin in the epoxy adhesive formulation may by way of non-limiting example include the diglycidylether of bis-phenol A (DGEBA), the diglycidylether of bis-phenol F, and glycidyl ethers of phenolic novolac resins (novolac epoxy resins). The curing agent may include by way of non-limiting example aliphatic amines, aromatic amines, amidoamine compounds, polyamides, anhydrides, marcaptans, polysulphides, catalytic curing agents, and latent curing agents.

In an embodiment of the invention the microwave generator provides microwaves in the range 1 to 100 GHz, and in a preferred embodiment the microwave generator provides microwaves in the frequency range 1 to 10 GHz. The power output of the microwave generator may be 50 W to 50 kW, and preferably 100 W to 1 kW. In a further embodiment, the output of the microwave generator may be pulsed at specified time intervals and/or it may be of variable frequency. The time for which the membrane module is irradiated by microwaves should be in the range 1 minute to 24 hours, and preferably in the range 10 minutes to 6 hours.

The membrane modules described above can be used for ultrafiltration or nanofiltration operations in organic solvents. The ability to cure highly chemically resistant adhesives without substantially heating the membrane, and thus altering its separation properties, by using microwaves is a major advantage over conventional thermal curing.

By the term "nanofiltration" it is meant a membrane process which will allow the passage of solvents while retarding the passage of larger solute molecules, when a pressure gradient is applied across the membrane. It is well understood by those skilled in the art that nanofiltration is a process in which at least one solute molecule i with a molecular weight in the range 100-2,000 g mol$^{-1}$ is retained at the surface of the membrane over at least one solvent, so that $R_i$>0. Typical applied pressures in nanofiltration range from 5 bar to 50 bar. Membrane rejection $R_i$, is a common measure of membrane performance and is defined as:

$$R_i = \left(1 - \frac{C_{P_i}}{C_{R_i}}\right) \times 100\% \qquad (1)$$

where $C_{P,i}$=concentration of species i in the permeate, permeate being the liquid which has passed through the membrane, and $C_{R,i}$=concentration of species i in the retentate, retentate being the liquid which has not passed through the membrane. It will be appreciated that a membrane is selectively permeable for a species i if $R_i$>0.

By the term "ultrafiltration" it is meant a membrane process which will allow the passage of solvents while retarding the passage of larger solute molecules, when a pressure gradient is applied across the membrane. It is well understood by those skilled in the art that ultrafiltration is a process in which at least one solute molecule i with a molecular weight in the range 2,000-200,000 g mol$^{-1}$ is retained at the surface of the membrane over at least one solvent, so that $R_i$>0. Typical applied pressures in nanofiltration range from 0.5 bar to 5 bar.

The term "solvent" will be well understood by the average skilled reader and includes an organic or aqueous liquid with molecular weight less than 300 Daltons. It is understood that the term solvent also includes a mixture of solvents.

By way of non-limiting example, solvents include aromatic hydrocarbons, alkanes, ketones, glycols, chlorinated solvents, esters, ethers, amines, nitriles, aldehydes, phenols, amides, carboxylic acids, alcohols, furans, dipolar aprotic solvents, water, and mixtures thereof.

By way of non-limiting example, specific examples of solvents include toluene, xylene, benzene, styrene, anisole, chlorobenzene, dichlorobenzene, chloroform, dichloromethane, dichloroethane, methyl acetate, ethyl acetate, butyl acetate, methyl ether ketone (MEK), methyl iso butyl ketone (MIBK), acetone, ethylene glycols, ethanol, methanol, propanol, butanol, hexane, cyclohexane, dimethoxyethane, methyl tert butyl ether (MTBE), diethyl ether, adiponitrile, N,N dimethylformamide, dimethylsulfoxide, N,N dimethylacetamide, dioxane, nitromethane, nitrobenzene, pyridine, carbon disulfide, tetrahydrofuran, methyltetrahydrofuran, N-methyl pyrrolidone, acetonitrile, water, and mixtures thereof.

The term "solute" will be well understood by the average skilled reader and includes an organic molecule present in a liquid solution comprising a solvent and at least one solute molecule such that the weight fraction of the solute in the liquid is less than the weight fraction of the solvent, and where the molecular weight of the solute is at least 20 g mol$^{-1}$ higher than that of the solvent.

The membrane module of the present invention relates to spiral wound membrane modules, however the method can be applied to other designs known to those skilled in the art that utilise adhesives, such as shell and tube, and derivative designs thereof.

The following examples illustrate the invention.

EXAMPLES

Example 1—Stability of Epoxy Resin Formulations Cured with Thermal Heating and Microwave Irradiation In the following example, test sections were made from an epoxy formulation consisting of 1 molar epoxy equivalent of a bis-phenol A resin (for example Epon 828 from Hexion Specialty Chemicals) to 1 molar amine equivalent of xylenediamine (from Sigma-Aldrich Chemical Company). The epoxy resin and xylenediamine were blended together using an electric mixer and syringed into lengths of ¼" external diameter PTFE tube. These epoxy-filled sections of PTFE tube were then either placed into a conventional oven or microwave oven and cured at the conditions specified in Table 1. Once the test sections had completed their curing schedule they were allowed to cool and were then cut into pieces weighing approximately 0.5 g each. Each of these pieces were weighed accurately to the nearest 0.0001 g on a 4 d.p. balance and immersed into methanol in separate bottles. After 10 and 28 days, the samples were taken out of the methanol, their surfaces dried by wiping with paper tissues, and re-weighed to the nearest 0.0001 g. The increase or decrease in weight after 10 days and 28 days was used to determine the percentage weight change of each sample. The weight change is a measure of chemical resistance—the lower the weight change the more resistant the material. The weight change at these time intervals is presented below in Table 1.

TABLE 1

Effect of curing regime of a bis-phenol A epoxy resin/xylenediamine adhesive formulation on weight gain upon immersion in methanol.

| Curing temperature or microwave power | Heating time (hours) | Number of days immersed | % Weight gain | Number of days immersed | % Weight gain |
|---|---|---|---|---|---|
| 30 C. | 24 | 10 | 4.5 | 28 | 6.0 |
| 150 C. | 1 | 10 | 2.7 | 28 | 4.2 |
| 150 C. | 2 | 10 | 2.6 | 28 | 4.2 |
| 180 C. | 1 | 10 | 2.4 | 28 | 3.8 |
| 180 C. | 2 | 10 | 2.3 | 28 | 3.7 |
| 600 W | 0.5 | 10 | 2.6 | 28 | 4.2 |
| 600 W | 1 | 10 | 2.6 | 28 | 4.1 |
| 600 W | 2 | 10 | 2.6 | 28 | 4.4 |
| 600 W | 3 | 10 | 2.7 | 28 | 4.2 |
| 600 W | 4 | 10 | 2.7 | 28 | 4.3 |

The effect of thermal and microwave curing is shown in Table 1. Applying a curing regime at near-ambient temperature (30 deg C.) shows the largest weight change. Whereas, the effect of curing is seen as a lower weight gain relative to 30 deg C. This is due to the further extent of reaction in the epoxy adhesive when it is cured at temperatures above 30 deg C. or microwave irradiated, which leads to additional crosslinking and a more chemically resistant material. Table 1 demonstrates that microwave and thermal curing generate materials of very similar properties.

Example 2—Effect of Microwave and Thermal Curing on Polyimide Nanofiltration Membranes and their Separation Properties Table 2 describes the effect of exposing a series of polyimide-based asymmetric nanofiltration membranes to microwave irradiation during the cure cycle of a bis-phenol A-based epoxy adhesive. A variable power 2.45 GHz microwave oven was used for this experiment, and the glue plus membrane samples were irradiated for 2 hours at 600 W. The polyimide membranes, MET-1, were formed from P84 polyimide (HP Polymers, Lenzing, Austria) and exhibit the properties of a nanofiltration membrane. A portion of the MET-1 membrane was further processed with an alkyl diamine to form the crosslinked membrane MET-1-X which also exhibits nanofiltration properties. Both membrane types were conditioned with a non-reactive, non-volatile species (i.e. mineral oil) after casting was complete to allow the membrane to be dried and maintain its nanofiltration structure. A small portion of each membrane was retained and dried without the addition of any conditioning agent. A commercial Starmem™ membrane was also tested. The visual observations of each membrane after the curing cycle are reported in Table 2.

The MET-1 and MET-1-X membranes without a conditioning agent showed no visible indication of any changes due to the microwave irradiation. Also, the commercial Starmem™ membranes and the MET-1-X membrane conditioned with mineral oil showed no visible damage after curing.

TABLE 2

Effect of microwave curing in the presence of a bis-phenol A resin-based epoxy adhesive on polyimide nanofiltration membranes preserved with various conditioning agents.

| Membrane | Before curing | After microwave curing |
|---|---|---|
| Non-crosslinked polyimide membranes: | | |
| MET - 1 (no conditioning agent) | Pale yellow, shinny surface | No change |
| Starmem 122* | Yellow, shinny surface | No change |
| Starmem 240* | Yellow, shinny surface | No change |
| Crosslinked membranes: | | |
| MET-1-X (no conditioning agent) | Pale yellow, shinny surface, brittle | No change |
| MET-1-X (with mineral oil conditioning agent) | Yellow, shinny surface, brittle | No change |

*Starmem ™ is a trademark of WR Grace & Co. -Conn. Starmem contains a long-chain hydrocarbon conditioning agent.

The mineral oil and long-chain hydrocarbon conditioning agents do not contain any polarisable bonds and thus are not excited by microwaves. This leads to no significant temperature rise in the membrane and hence damage during the epoxy adhesive curing cycle. I.e. Mineral oil and hydrocarbon conditioning agents are suitable for use as a conditioning agent if the adhesive in a membrane module is to be cured using microwave technology. In general, any non-volatile compound with a minimal content of polarisable bonds will be suitable for use as a conditioning agent if the adhesive in a membrane module is to be cured using microwave technology.

The permeate flux and separation characteristics of membranes exposed to thermal and microwave cure conditions are outlined below in Table 3 and FIG. 1. The flux and rejection measurements were made using a laboratory scale cross-flow nanofiltration unit with 1-4 cross flow cells. Membrane discs, of active area 14 $cm^2$, were cut out from flat sheets and placed into up to 4 cross flow cells connected in series. A feed solution consisting of <1 wt % of test solutes was charged into a 5 L feed tank and re-circulated at a flow rate of 1.5 L $min^{-1}$ using a diaphragm pump (Hydra-Cell, Wanner, USA). Pressure in the cells was generated using a backpressure regulator which was located downstream of a pressure gauge. The pressure drop across the cells was measured to be less than 0.5 bar. The re-circulating liquid was kept at 30° C. by a heat exchanger. During operation, permeate samples were collected from individual sampling ports for each cross-flow cell and the retentate sample was taken from the feed tank. All data was collected after 4 hours operation at the specified temperature and pressure.

TABLE 3

Toluene flux across Starmem122 and MET-1 membranes at 30bar and 30° C. after they have been subjected to a thermal or microwave cure cycle.

| | | Curing conditions | | |
|---|---|---|---|---|
| Entry | Membrane | Temperature (° C.) or Power (W)* | Time (Hrs) | Flux (L · $m^{-2}$ · $h^{-1}$) |
| 1 | Starmem122 | No curing | — | 83 |
| 2 | Starmem122 | No curing | — | 69 |
| 3 | Starmem122 | 75° C. | 19 | 75 |
| 4 | Starmem122 | 100° C. | 2.5 | 41 |
| 5 | Starmem122 | 120° C. | 0.7 | 51 |
| 6 | Starmem122 | 600 W | 3 | 80 |
| 7 | Starmem122 | 600 W | 4 | 82 |
| 8 | MET-1 (mineral oil conditioning agent) | No curing | — | 59 |
| 9 | MET-1 (mineral oil conditioning agent) | 100° C. | 2.5 | 31 |

*Irradiation power of a 2.45 GHz microwave source.

The solvent flux $N_v$ was calculated from the equation:

$$N_v = \frac{V}{At} \quad (2)$$

Where V=volume of a liquid sample collected from the permeate stream, t=time over which the liquid sample is collected, A=membrane area.

Entries 1-7 in Table 3 show the effect of a thermal or microwave curing cycle on the flux of the Starmem122 membrane, which contains a long chain hydrocarbon conditioning agent. For entries 1-3 and 6-7, the flux is comparable, indicating that heating at 75 deg C. and below, or with a 2.45 GHz microwave source has no effect on the membrane's permeate flux. Entries 4 and 5 indicate that heating at 100 and 120 deg C. have a negative effect on the membrane performance in terms of toluene flux. Entries 8 and 9 show the effect of thermal curing of the MET-1 membrane when conditioned with mineral oil. It can also be seen, as with Starmem122, that a 100 deg C. curing cycle significantly reduces the toluene permeate flux. These results indicate that curing at temperatures above 75 deg C., have a negative impact on the polyimide membranes and changes their properties regardless of what type of conditioning agent is used. Also, irradiation of these polyimide membranes with 2.45 GHz microwaves at 600 W power does not have a significant impact on the membranes' permeate flux properties.

FIG. 1 shows the separation performance of the Starmem™122 membranes described in Table 3, Entries 1-7. The separation performance was characterised in terms of rejection, as defined previously in equation 1. The rejections were determined by equation (1) using a solution of polystyrene oligomers in the named solvent, following the method described by See-Toh Y H, Loh X X, Li K, Bismarck A, Livingston A G, "In search of a standard method for the characterisation of organic solvent nanofiltration membranes", Journal of Membrane Science 2007, Volume 291, pages 120-125. It can be seen in FIG. 1 that the rejection performance of the membranes is consistent across all thermal and microwave curing cycles. I.e. Subjecting the membrane to a curing cycle does not have a negative impact on rejection performance.

Overall, this shows that using microwaves to attain maximum chemical resistance of an epoxy adhesive system can be successfully applied without affecting the flux and rejection performance of polyimide-based membranes.

(b) positioning the polymeric nanofiltration or ultrafiltration membrane in its desired location within the membrane module and rolling the membrane and spacers to produce a green spiral wound membrane module ensemble with said adhesive not cured to a degree sufficient to guarantee structural integrity of the membrane ensemble; and (c) applying microwave radiation to the green ensemble to cure the adhesive used to seal the module.

2. A process according to claim 1 wherein the adhesive requires heating at temperatures above 40 deg. C. to fully cure.

3. A process according to claim 1 wherein the adhesive contains epoxy functional groups.

4. A process according to claim 1 wherein the adhesive contains epoxy resins based on the diglycidylether of bis-phenol A (DGEBA) or diglycidylether of bis-phenol F (DGEBF) or glycidyl ether of a phenolic novolac resin (novolac epoxy resins).

5. A process according to claim 1 wherein the adhesive requires a curing agent based on an aliphatic amine or an aromatic amine or a polyamide or an aminoamide or a mercaptan or a polysulphide or a latent curing agent or an anhydride or a catalytic curing agent for the adhesive to cure.

6. A process according to claim 1 wherein the adhesive requires greater than 0.1 hour to fully cure.

7. A process according to claim 1 wherein the membrane material consists of an organic polymer material and optionally contains imide bonds.

8. A process according to claim 7 wherein the organic polymer comprises the following formulation:

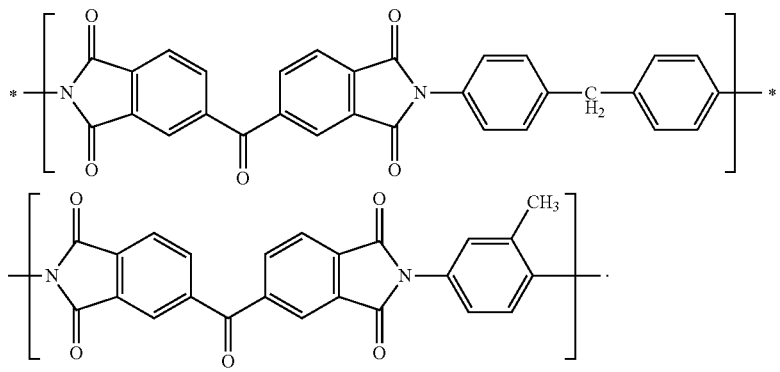

The invention claimed is:

1. A process for manufacturing membrane modules comprising a polymeric nanofiltration or ultrafiltration membrane wherein the membrane is substantially unaffected by microwave radiation, a feed spacer, a permeate spacer, a permeate tube, and end caps, the process comprising the steps of:

(a) applying glue lines of an epoxy adhesive containing one or more polarisable bonds to the polymeric nanofiltration or ultrafiltration membrane, wherein the polarisable bonds are capable of being excited by microwave radiation;

9. A process according to claim 1 in which the microwave radiation is in the frequency range 1 to 100 GHz.

10. A process according to claim 1 in which the power of the microwave source is in the range 50 W to 5 kW.

11. A process according to claim 1 in which the microwave radiation is switched so that it is applied in discrete time intervals.

12. A process according to claim 11, wherein the discrete time interval is from 1 second to 10 minutes.

13. A process according to claim 11, wherein radiation is applied for a single time interval or is applied in a plurality of pulses.

14. A process according to claim 1 in which the frequency of the microwave radiation is modulated.

* * * * *